United States Patent
Permar

[11] Patent Number: 5,482,441
[45] Date of Patent: Jan. 9, 1996

[54] LIQUID FLOW CONTROL SYSTEM

[76] Inventor: Clark Permar, P.O. Box 701, Bolinas, Calif. 94924

[21] Appl. No.: 228,884

[22] Filed: Apr. 18, 1994

[51] Int. Cl.$^6$ .................................................. F04B 49/08
[52] U.S. Cl. .............................. 417/216; 417/53; 417/63; 417/350; 210/416.3
[58] Field of Search ........................ 417/212, 216, 417/313, 350, 244, 53, 63; 210/416.1, 416.3

[56]        References Cited

U.S. PATENT DOCUMENTS

| | | |
|---|---|---|
| Re. 33,135 | 12/1989 | Wanner, Sr. et al. . |
| 4,124,488 | 11/1978 | Wilson . |
| 4,243,523 | 1/1981 | Pelmulder ............................ 210/416.3 |
| 4,378,200 | 3/1983 | Edwards et al. ........................ 417/216 |
| 4,395,130 | 7/1983 | Kutowy ................................ 417/250 |
| 4,686,831 | 8/1987 | Silva . |
| 4,702,842 | 10/1987 | Lapierre . |
| 4,756,830 | 7/1988 | Rredkin . |
| 4,836,924 | 6/1989 | Solomon . |
| 4,842,725 | 6/1989 | Blad et al. . |
| 4,966,708 | 10/1990 | Oklejas et al. . |
| 4,973,408 | 11/1990 | Keefer . |
| 4,983,301 | 1/1991 | Szucz et al. . |
| 4,983,305 | 1/1991 | Oklejas et al. . |
| 4,995,795 | 2/1991 | Hetzel et al. . |
| 5,110,468 | 5/1992 | Miyashita et al. ................... 210/416.3 |
| 5,193,988 | 3/1993 | Solomon . |
| 5,203,803 | 4/1993 | Schoenmeyr . |

*Primary Examiner*—Richard A. Bertsch
*Assistant Examiner*—Charles G. Freay
*Attorney, Agent, or Firm*—Thomas R. Lampe

[57]        ABSTRACT

Apparatus for controlling flow of a liquid includes a variable displacement liquid pump and a variable displacement liquid meter, the pump and meter being driven by the same drive motor. Containment structure defines a liquid flow path between the pump and meter for containing liquid received from the pump.

20 Claims, 1 Drawing Sheet

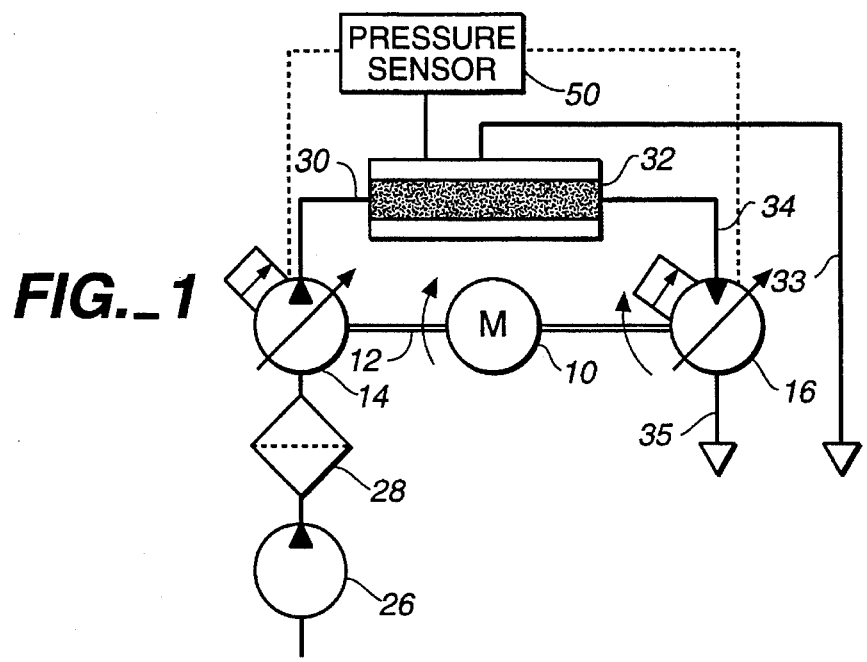
FIG._1
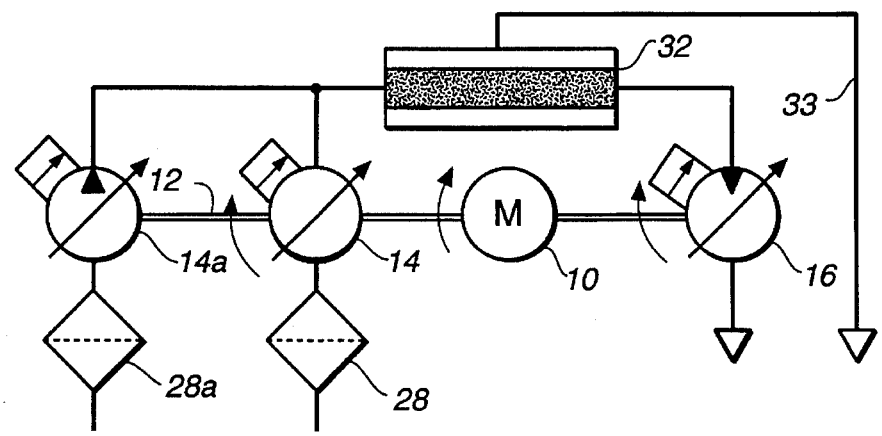
FIG._2
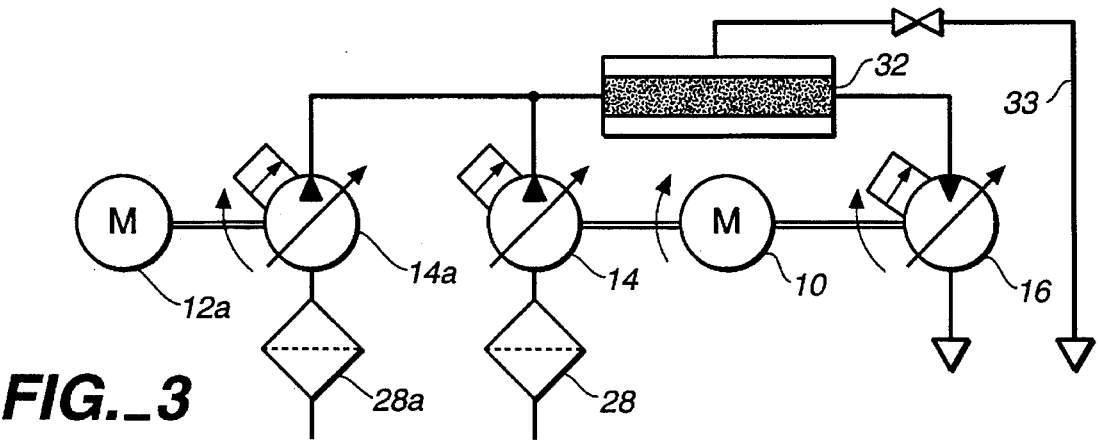
FIG._3

LIQUID FLOW CONTROL SYSTEM

TECHNICAL FIELD

This invention relates to apparatus for flowing a liquid in a controlled manner under either pressurized or unpressurized conditions. The apparatus embodiments disclosed herein include a filter to separate the liquid into a permeate portion and a concentrate portion and the invention is applicable to desalinate sea water. The invention also encompasses a method.

BACKGROUND ART

Numerous systems are known in the prior art for desalinating sea water. Many of the prior art systems utilize reverse osmosis to accomplish such objective. Typically, prior art desalinization systems are very expensive to operate and difficult to service. Piston pumps are known expedients for pressurizing sea water or other liquid to be separated into permeate portions and concentrate portions. Turbine pumps are another well known expedient for accomplishing that objective.

Inefficient in any event, such prior art arrangements become even more so unless optimum pressures are maintained in the system for particular conditions such as the temperature of the sea water. Prior art systems are generally such that pressure adjustment is difficult if not impossible, particularly on an efficient and economic basis. Pump or turbine input speeds must normally be regulated in the prior art systems and this is difficult to do when alternating current is the power source.

The following United States patents are known and are believed to be representative of the state of the prior art in this field: U.S. Pat. No. 4,973,408, issued Nov. 27, 1990, U.S. Pat. No. 4,836,924, issued Jun. 6, 1989, U.S. Pat. No. 4,995,795, issued Feb. 26, 1991, U.S. Pat. No. 5,193,988, issued Mar. 16, 1993, U.S. Pat. No. Re. 33,135, Dec. 26, 1989, U.S. Pat. No. 4,124,488, issued Nov. 7, 1978, U.S. Pat. No. 4,686,831, issued Aug. 18, 1987, U.S. Pat. No. 4,983,301, issued Jan. 8, 1991, U.S. Pat. No. 4,983,305, issued Jan. 8, 1991, U.S. Pat. No. 5,203,803, issued Apr. 20, 1993, U.S. Pat. No. 4,702,842, issued Oct. 27, 1987, U.S. Pat. No. 4,842,725, issued Jun. 27, 1989, U.S. Pat. No. 4,756,830, issued Jul. 12, 1988, and U.S. Pat. No. 4,966,708, issued Oct. 30, 1990.

DISCLOSURE OF INVENTION

The apparatus and method of the present invention provide a highly efficient, relatively low cost approach for desalinization of sea water or other operations wherein it is desired to flow a liquid under controlled unpressurized or pressurized conditions. The system disclosed herein is utilized to separate the liquid into a permeate portion and a concentrate portion; however, the controlled flow approach of this invention can be utilized in other operating environments such as in chemical processes. The pressure of the liquid passing through the system can be readily and promptly adjusted. Adjustment is accomplished without the requirement of changing the speed of a prime mover utilized in the system.

The apparatus of the present invention includes a variable displacement liquid pump having a liquid inlet, a liquid outlet and a rotatable pump element.

The apparatus also includes a variable displacement liquid metering pump having a liquid inlet, a liquid outlet and a rotatable metering pump element.

Containment structure is provided which defines a liquid flow path between the liquid outlet of the variable displacement liquid pump and the liquid inlet of the variable displacement liquid metering pump for containing liquid received from the variable displacement liquid pump and delivering the pressurized liquid to the variable displacement liquid metering pump through the liquid flow path.

Drive means simultaneously drives and rotates both the rotatable pump element and the rotatable metering pump element to cause liquid flow within the liquid flow path of the containment structure between the liquid outlet of the variable displacement liquid pump and the liquid inlet of the variable displacement liquid metering pump.

In the arrangement disclosed herein, filter means is connected to the containment structure in fluid flow communication with the liquid flow path between the liquid outlet of the variable displacement liquid pump and the liquid inlet of the variable displacement liquid metering pump for separating a permeate portion from a concentrate portion of pressurized liquid flowing through the liquid flow path.

The drive means comprises a drive motor having a rotatable output shaft. The rotatable output shaft is operably connected to both the rotatable pump element and the rotatable metering pump element to simultaneously drive and rotate both the rotatable pump element and the rotatable metering pump element.

The method of the invention includes the step of pumping a liquid through a variable displacement liquid pump. After the pumping step, the liquid is introduced into a confined liquid flow path.

The method also includes the step of flowing the liquid within the confined liquid flow path.

The method includes flowing liquid in the confined fluid flow path to and through a variable displacement liquid metering pump. Adjustment of the displacement of at least one of the variable displacement liquid pump and variable displacement liquid metering pump is made to change the flow of the liquid in the confined fluid flow path.

Other features, advantages, and objects of the present invention will become apparent with reference to the following description and accompanying drawings.

BRIEF DESCRIPTION OF DRAWINGS

FIG. 1 is a schematic view illustrating an embodiment of apparatus constructed in accordance with the teachings of the present invention;

FIG. 2 is a schematic view of an alternate embodiment; and

FIG. 3 is a schematic view of yet another embodiment.

BEST MODE FOR CARRYING OUT THE INVENTION

Referring now to FIG. 1, apparatus constructed in accordance with the teachings of the present invention includes an electric motor 10 having an output shaft 12 which extends from both ends of the motor housing.

One end of output shaft 12 extends to a variable displacement liquid pump 14 and the other end extends to a variable displacement liquid metering pump 16. The construction of variable displacement pumps, motors and similar devices per se is well known in their respective arts so such devices will not be described in detail. Suffice it to say that the variable displacement liquid pump 14 is preferably a variable displacement axial piston pump and the variable displacement liquid metering pump is preferably in the form of a variable displacement axial piston pump/motor of "closed end " design which in this instance is employed as a proportional metering device. Exemplary devices of this type are made available by SPERRY-VICKERS under the P.V SERIES identification.

Liquid pump 14 has a pump inlet and a pump outlet. In the arrangement illustrated, a pump 26 upstream from pump 14 delivers liquid, in this case untreated water, through a filter 28 and to the pump inlet.

Through the pump outlet, liquid pump 14 delivers liquid to a containment structure including a conduit 30. The other end of conduit 30 is connected to a reverse osmosis filter 32 which may be of any suitable well known construction. As is conventional, reverse osmosis filter 32 will serve to separate out a permeate portion in the form of fresh water if the liquid in the containment structure is pressurized to a certain extent, the permeate portion exiting conduit 33. The remaining portion, the concentrate portion, flows through a conduit 34 leading to the liquid inlet of variable displacement liquid metering pump 16. Conduits 30, 34 together comprise containment structure cooperable with reverse osmosis filter 32 defining a liquid flow path which receives the liquid exiting the variable displacement liquid pump 14.

The concentrate portion of the liquid, brine in the case of salt water, exits the liquid outlet of variable displacement liquid metering pump 16. The concentrate portion may be discharged to any suitable location through a conduit 35 leading from metering pump 16 or may be recirculated back to variable displacement liquid pump 14.

The structure just described can readily, efficiently, and inexpensively modify the pressure of the pressurized liquid passing through the liquid flow path of the containment structure. This is accomplished by adjusting either one or both of the variable displacement liquid pump and the variable displacement liquid metering pump. Pressures at a reverse osmosis filter are optimum at certain pressure ranges depending upon such factors as liquid temperature, flow rates, nature of the liquid, etc. Pressure adjustment to provide optimum results can be accomplished with the present invention without the necessity of modifying the speed of a prime mover such as motor 10 which is typically AC powered.

A sensor 50 of any suitable commercial type may be utilized to continuously monitor the pressure of the pressurized liquid passing through reverse osmosis filter 32. Sensor 50, in the arrangement illustrated, is in operative association with both the variable displacement liquid metering pump and variable displacement liquid pump and may adjust either or both of the variable displacement liquid metering pump and variable displacement liquid pump through suitable, known servomechanisms. If desired, the pump and metering pump can be adjusted to depressurize the flowing fluid in the containment structure completely and thus stop flow through the filter. Sensor 50 may be employed to sense flow rate rather than or in addition to pressure and make appropriate adjustment on that basis.

FIG. 2 shows an arrangement similar to that of FIG. 1 except for the addition of a second or supplemental pump 14a in the circuit also operated by the shaft 12.

In the embodiment of FIG. 3, the supplemental pump 14a is operated by a separate motor 12a. These approaches will allow liquids to be introduced into the system from different sources. This may, for example, be desired when the apparatus is utilized for other applications as well as cross-flow filtration. Also, in the FIG. 2 and FIG. 3 embodiments, pumps and metering pumps can be of equal displacement, the supplemental pump causing circulation flow past the filter at pressure developed by the supplemental pump.

I claim:

1. Liquid treatment apparatus for providing and controlling a flow of liquid, said apparatus comprising, in combination:

a variable displacement liquid pump having a liquid inlet, a liquid outlet and a rotatable pump element;

a variable displacement liquid metering pump having a liquid inlet, a liquid outlet and a rotatable metering pump element;

containment structure defining a liquid flow path between the liquid outlet of said variable displacement liquid pump and the liquid inlet of said variable displacement liquid metering pump for containing liquid received from said variable displacement liquid pump and delivering said liquid to said variable displacement liquid metering pump through said liquid flow path; and drive means for simultaneously driving and rotating both said rotatable pump element and said rotatable metering pump element to cause liquid flow within the liquid flow path of said containment structure between the liquid outlet of said variable displacement liquid pump and the liquid inlet of said variable displacement liquid metering pump.

2. The apparatus according to claim 1 wherein said variable displacement liquid pump and said variable displacement liquid metering pump are cooperable to selectively vary the pressure of liquid in said containment structure.

3. The apparatus according to claim 2 additionally comprising filter means connected to said containment structure in fluid flow communication with said liquid flow path between the liquid outlet of said variable displacement liquid pump and the liquid inlet of said variable displacement liquid metering pump for separating a permeate portion from a concentrate portion of liquid pressurized by said variable displacement pump and said variable displacement metering pump and flowing through said liquid flow path.

4. The apparatus according to claim 1 wherein said drive means comprises a drive motor having a rotatable output shaft, said rotatable output shaft being operably connected to both said rotatable pump element and said rotatable metering pump element to simultaneously drive and rotate both said rotatable pump element and said rotatable metering pump element.

5. The apparatus according to claim 2 additionally comprising pump displacement adjustment means for adjusting the displacement of said variable displacement liquid pump independently of said variable displacement liquid metering pump to change the pressure of the pressurized liquid flowing through the liquid flow path.

6. The apparatus according to claim 2 additionally comprising metering pump displacement adjustment means for adjusting the displacement of said variable displacement liquid metering pump independently of said variable displacement liquid pump to change the pressure of the pressurized liquid flowing through the liquid flow path.

7. The apparatus according to claim 2 additionally comprising pump displacement adjustment means for adjusting the displacement of said variable displacement pump independently of said variable displacement liquid metering pump to change the pressure of the pressurized liquid flowing through the liquid flow path and displacement adjustment means for adjusting the displacement of said variable displacement liquid metering pump independently of said variable displacement liquid pump to change the pressure of the pressurized liquid flowing through the liquid flow path.

8. The apparatus according to claim 3 wherein said liquid is water and said filter means comprises a reverse osmosis filter.

9. The apparatus according to claim 1 additionally including liquid delivery means for delivering liquid under pressure to the liquid inlet of said variable displacement liquid pump.

10. The apparatus according to claim 9 wherein said liquid delivery means for delivering liquid under pressure to the liquid inlet of said Variable displacement liquid pump comprises a high pressure pump.

11. The apparatus according to claim 7 additionally comprising sensing means for sensing the pressure of pressurized liquid in said liquid flow path and at least one of said pump displacement adjustment means and said metering pump adjustment means being in operable association with said sensing means to adjust the displacement of at least one of said variable displacement liquid pump and said variable displacement liquid metering pump responsive to the pressure sensed by said sensing means.

12. The apparatus according to claim 9 wherein said apparatus additionally comprises pre-filter means for pre-filtering said liquid prior to delivery of said liquid under high pressure to the liquid inlet of said high pressure pump.

13. The apparatus according to claim 1 additionally comprising at least one supplemental variable displacement liquid pump in fluid flow communication with said containment structure.

14. A method for controlling flow of a liquid, said method comprising the steps of:

pumping said liquid through a variable displacement liquid pump;

after said pumping step, introducing said liquid into a confined liquid flow path;

flowing the liquid within the confined liquid flow path;

flowing liquid through said confined fluid flow path to and through a variable displacement liquid metering pump; and adjusting the displacement of at least one of said variable displacement liquid pump and variable displacement liquid metering pump to modify the flow of the liquid in said confined fluid flow path.

15. The method according to claim 14 wherein said variable displacement liquid pump includes a rotatable pump element and wherein said variable displacement liquid metering pump includes a rotatable metering pump element, said method including the step of simultaneously driving and rotating both said rotatable pump element and said rotatable metering pump element with a motor connected to both said rotatable pump element and said rotatable metering pump element.

16. The method according to claim 14 additionally comprising the step of pressurizing the liquid in said confined liquid flow path and flowing the pressurized liquid within the confined flow path past a filter in fluid flow communication with said confined liquid flow path to force pressurized liquid through the filter and separate the liquid into a permeate portion and a concentrate portion.

17. The method according to claim 16 wherein said liquid is water and wherein said filter is a reverse osmosis filter.

18. The method according to claim 14 including the step of delivering liquid under pressure to said variable displacement liquid pump.

19. The method according to claim 14 including the step of sensing the pressure of the liquid in said confined liquid flow path, said adjustment step being carried out responsive to the sensed pressure.

20. The method according to claim 14 including the step of sensing the flow rate of the liquid in said confined liquid flow path, said adjustment step being carried out responsive to the sensed flow rate.

\* \* \* \* \*